(12) United States Patent
BuAbbud et al.

(10) Patent No.: US 6,278,829 B1
(45) Date of Patent: Aug. 21, 2001

(54) OPTICAL FIBER ROUTING AND SUPPORT APPARATUS

(75) Inventors: George H. BuAbbud, Southlake; David L. Bergeron, Bedford; Janet A. Bradshaw, Flower Mound; Carl Smith, The Colony; Stephen J. Wilson, Cedar Hill, all of TX (US)

(73) Assignee: Marconi Communications, Inc., Cleveland, OH (US)

( * ) Notice: Subject to any disclaimer, the term of this patent is extended or adjusted under 35 U.S.C. 154(b) by 0 days.

(21) Appl. No.: 09/305,579

(22) Filed: May 5, 1999

(51) Int. Cl.[7] ........................................ G02B 6/00
(52) U.S. Cl. ........................ 385/135; 385/136; 385/137
(58) Field of Search ................................ 385/134–139

(56) References Cited

U.S. PATENT DOCUMENTS

| | | | |
|---|---|---|---|
| 5,100,221 | * 3/1992 | Carney et al. | 385/135 |
| 5,339,379 | * 8/1994 | Kutsch et al. | 385/135 |
| 5,430,823 | * 7/1995 | Dupont et al. | 385/135 |
| 5,640,482 | * 6/1997 | Barry et al. | 385/135 |
| 5,758,002 | * 5/1998 | Walters | 385/134 |
| 5,913,006 |   6/1999 | Summach . | |

FOREIGN PATENT DOCUMENTS

| | | |
|---|---|---|
| 9312154 | 6/1994 | (DE) . |
| 582744A1 | 2/1994 | (EP) . |
| 2738354 | 3/1997 | (FR) . |

* cited by examiner

Primary Examiner—Hemang Sanghavi
Assistant Examiner—Omar Rojas
(74) Attorney, Agent, or Firm—Jones, Day, Reavis and Pogue

(57) ABSTRACT

Optical fiber supporting and routing apparatus is disclosed which includes a support member for attaching a multiplicity of optical fibers which are bundled together and the bundle is coiled. An attaching bracket is secured to the support member for mounting the distribution unit.

14 Claims, 3 Drawing Sheets

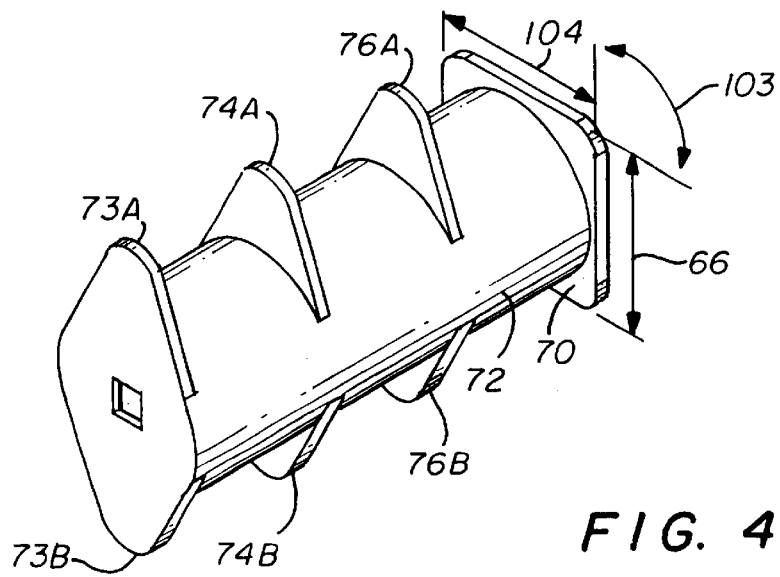
FIG. 4
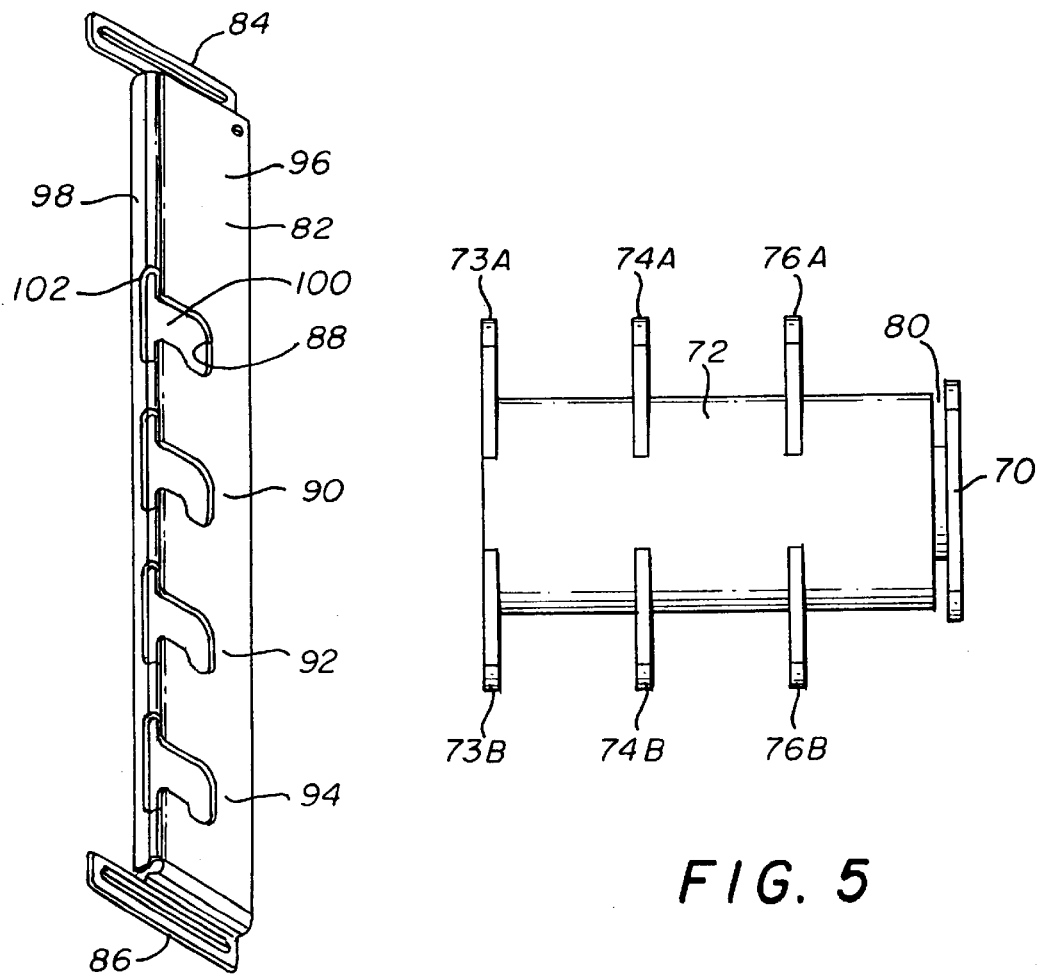
FIG. 5
FIG. 6

US 6,278,829 B1

OPTICAL FIBER ROUTING AND SUPPORT APPARATUS

BACKGROUND OF THE INVENTION

1. Field of the Invention

The present invention relates to optical fiber communication apparatus and more specifically to apparatus for supporting bundles of fiber optics and for providing routing support to individual optical fibers of a bundle.

2. Description of Related Art Including Information Disclosed Under 37 CFR 1.97 and 1.98

The telecommunications industry is using more and more optical or light fibers in lieu of copper wire. Optical fibers have an extremely high band width thereby allowing significantly more information than can be carried by a copper wire.

However, of course, for most cities there already exists an infrastructure of copper wiring for telephonic communications, which infrastructure is only slowly being upgraded and improved by modem techniques. As a result, upgrading present communications systems to include more and more optical fiber transmission paths typically occurs as an upgrading event. Therefore, an optical fiber distribution terminal cabinet may initially have a single panel for the distribution of optical fibers. Eventually, however, additional panels or equipment also requiring the use of optical fibers will likely occur. The continuing adding of more and more optical fibers, optical fiber panels, and equipment creates a need for apparatus to provide neat and convenient techniques for routing the fibers for ready identification and connections.

SUMMARY OF THE INVENTION

It is an object of this invention to provide inexpensive equipment to aid in the installation of fiber-optical equipment.

It is a further object of this invention to provide equipment which can be added to existing equipment and provide support for additional bundles of optical fibers.

It is yet another object of the invention to provide apparatus for supporting individual fibers as the fibers are routed from one location to another.

The present invention accomplishes these and other objects by providing fiber-optic routing and support apparatus which comprises an optical fiber distribution unit having a multiplicity of optical fibers, each of which has a first end and a terminal end. The multiplicity of fibers are bundled together and the bundle is coiled and attached to a support member. An attaching bracket secured to the support member allows mounting of the bracket and bundle of fiber-optical cables to the frame of a distribution cabinet or terminal where the fibers are to be used. The bracket used for mounting the distribution unit defines a hook portion which hooks over a portion of the cabinet frame so as to support and mount the bundle of optical fibers. Spaced from the hooked member is included a spring catch which is located to engage another portion of the support frame. The apparatus farther comprises a support rail which defines a plurality of support notches and is secured to the cabinet frame. At least one spool member, typically made of plastic, is received and supported by one of the notches in the support rail such that it is positioned and located to support at least one of the optical fibers leading from the bundle as the optical fiber is routed to a terminal point. In a preferred embodiment, the support spool includes a fiber-optic support post and the fiber-optic support post in turn defines a circumferential attaching groove at one of its ends. In addition, the support rail has a front face and a side face which form an "L" cross-sectional shape. The support notch which is defined in the front face of the rail further defines a throat portion extending from an entrance groove defined in the side face of the rail such that the circumferential groove of the spool passes through the throat portion to the support notch. The spool may further define a backing plate attached to the first end of the spool, which backing plate has a larger area than the cross section of the spool. The backing plate is then received by the entrance groove defined in the side face of the support rail.

In one preferred embodiment, the coiled bundle of optical fibers attached to the support member will have the first end terminated in a second optical fiber panel to be added to the distribution cabinet and the terminal ends will have a connector suitable for connecting to terminals on the existing fiber-optic panel.

BRIEF DESCRIPTION OF THE DRAWINGS

These and other features of the present invention will be more fully disclosed when taken in conjunction with the following Detailed Description of the Preferred Embodiment(s) in which like numerals represent like elements and in which:

FIGS. 4 and 5 show a perspective view and plan view, respectively, of the support spool of the present invention; and FIG. 6 shows a perspective view of the rail used to mount the support spools of the present invention.

DETAILED DESCRIPTION OF THE PREFERRED EMBODIMENT(S)

Figure 1:
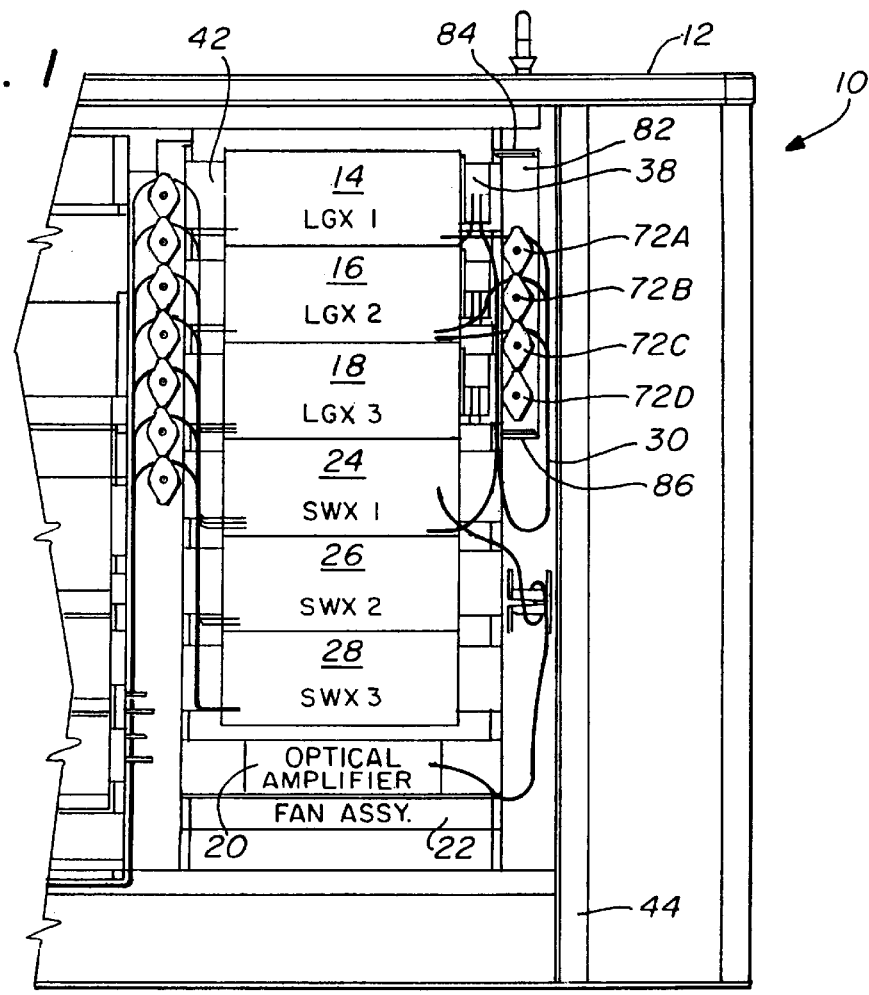
FIG. 1 is a plan view of the apparatus of this invention mounted in a fiber-optic distribution cabinet.

Referring now to FIG. 1, there is shown generally at 10 a remote distribution box or terminal 12 containing three original fiber-optic panels 14, 16, and 18, as well as an optical amplifier 20 and a fan assembly 22. It will be appreciated, of course, that although the FIG. 1 shows three original fiber-optical panels 14–18 such as LGX (light guide cross-connect) panels, the number of panels could be either greater or less than shown. In addition, for purposes of this invention, it is not necessary that the panels be the LGX type. Nor is it necessary that an optical amplifier 20 and the fan assembly 22 be located as indicated in the drawing. The arrangement and location and number of these panels are for illustration purposes only. Also as shown, there are three new SWX (splitter Wave Division Multiplexing) fiber-optical panels 24, 26, and 28 which will be discussed in more detail hereinafter. Each of the new or added fiber-optic panels 24, 26, and 28 has a bundle of attached fiber-optical cables such as bundle 30 leading from panel 24. The bundle of fiber-optical cables 30 carries a multiplicity of individual fibers attached at one end to the panel 24 and a support member 32 to which the bundle or fibers were coiled and attached. Each of the individual fibers of bundle 30 are then provided as separate lengths such as optical fibers 34A, 34B, 34C, and 34N. Also as shown, each of the individual fibers includes a quick-disconnect terminal such as connectors 36A, 36B, 36C, and 36N. The support member 32 to which the bundle or coil of fibers 38 is attached includes a hook portion 40, according to a preferred embodiment. To support the coil of fibers, hook portion 40 simply hooks over a member 42 of the cabinet frame structure 44 of the remote digital terminal 12. Also included with attaching bracket 32 is a spring portion 46 having a boss 48 which snaps behind the frame member 42 and acts as a quick-disconnect member. Thus, it is seen that the support member 32 with the coil 38 of fiber-optical cables can be quickly snapped into place and quickly disconnected when necessary. Although the individual quick-disconnect connectors 36A–36N are shown as not being connected, according to one preferred embodiment, each of the individual terminals will be connected to individual ones of the matching connectors 50A, 50B, 50C, and 50N on the front of panel 52 of distribution panel 24 as indicated by dashed lines 54A, 54B, 54C, and 54N. By creating such a closed loop with the panel connectors and the connectors on the ends of the fiber optics, it is then unnecessary to include individual termination plugs or members on the terminal 36A–36N to avoid reflection of the light. Although only one fiber-optical distribution panel 24 is illustrated in FIG. 2, it will be appreciated that panels 26 and 28 will also include the attached coil 38 of fiber optics with the individual fibers and fiber connectors as shown in FIG. 2.

Although as discussed above, the fiber-optics distribution panel 24 may be originally installed with the terminal connectors or ends 36A–36N attached to individual terminals or matching connectors 50A and 50N on the front plate 52 of distribution panel 24, each individual optical fiber can readily be disconnected and attached to matching connectors on the original distribution panels 16, 18, and 30 as necessary or required.

Figure 3A:
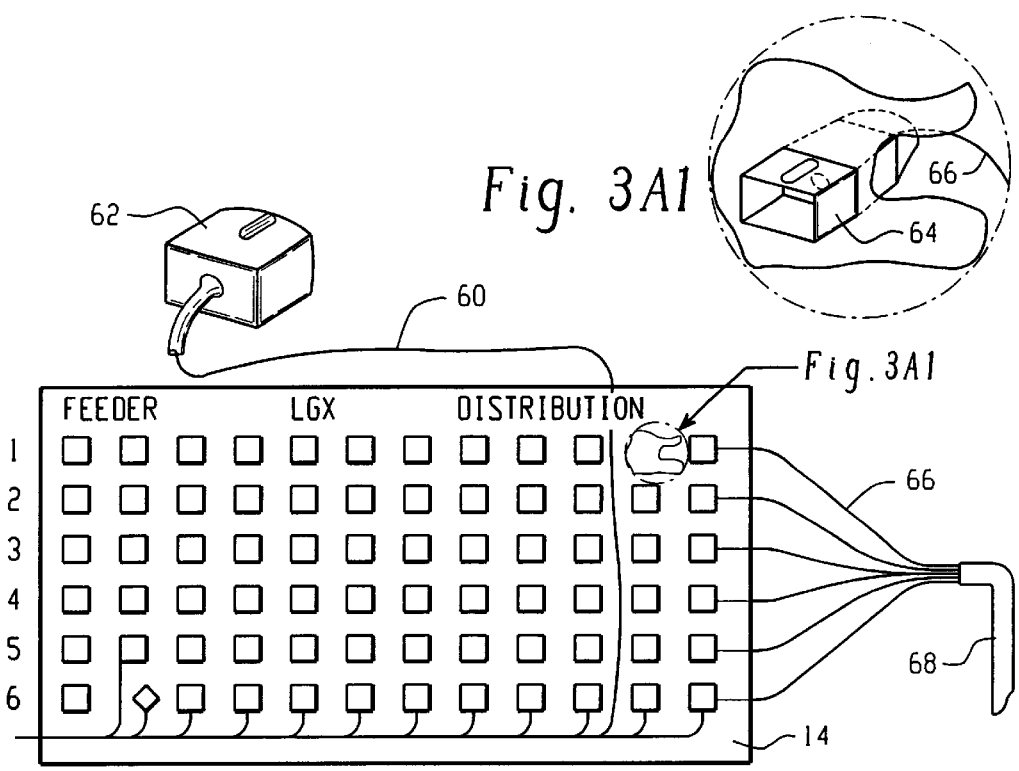
FIG. 3A shows a schematic view of a fiber-optic panel before the addition of the apparatus of the present invention and FIG. 3B shows an after-view with a second optical fiber panel in place along with the apparatus of the present invention.

For example, referring now to FIG. 3A, there is shown the original panel 14, which will typically have a multiplicity of individual optical fibers such as optical fiber 60 with a quick-disconnect connector member 62, which connects to a receiving panel connector 64, which in turn is attached to another individual fiber 66 for distribution to a second or remote location through the bundle of fibers 68.

Figure 2:
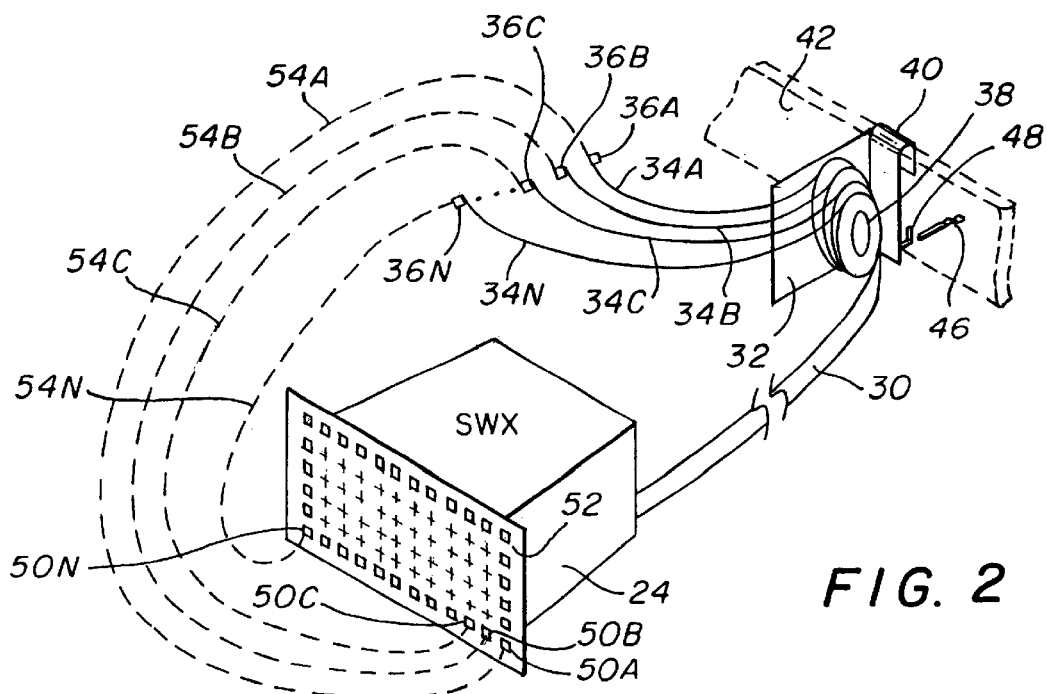
FIG. 2 is a perspective view of a coiled bundle of fiber optics attached to a support member adjacent the fiber-optic panel and ready for mounting on the cabinet frame.
Figure 3B:
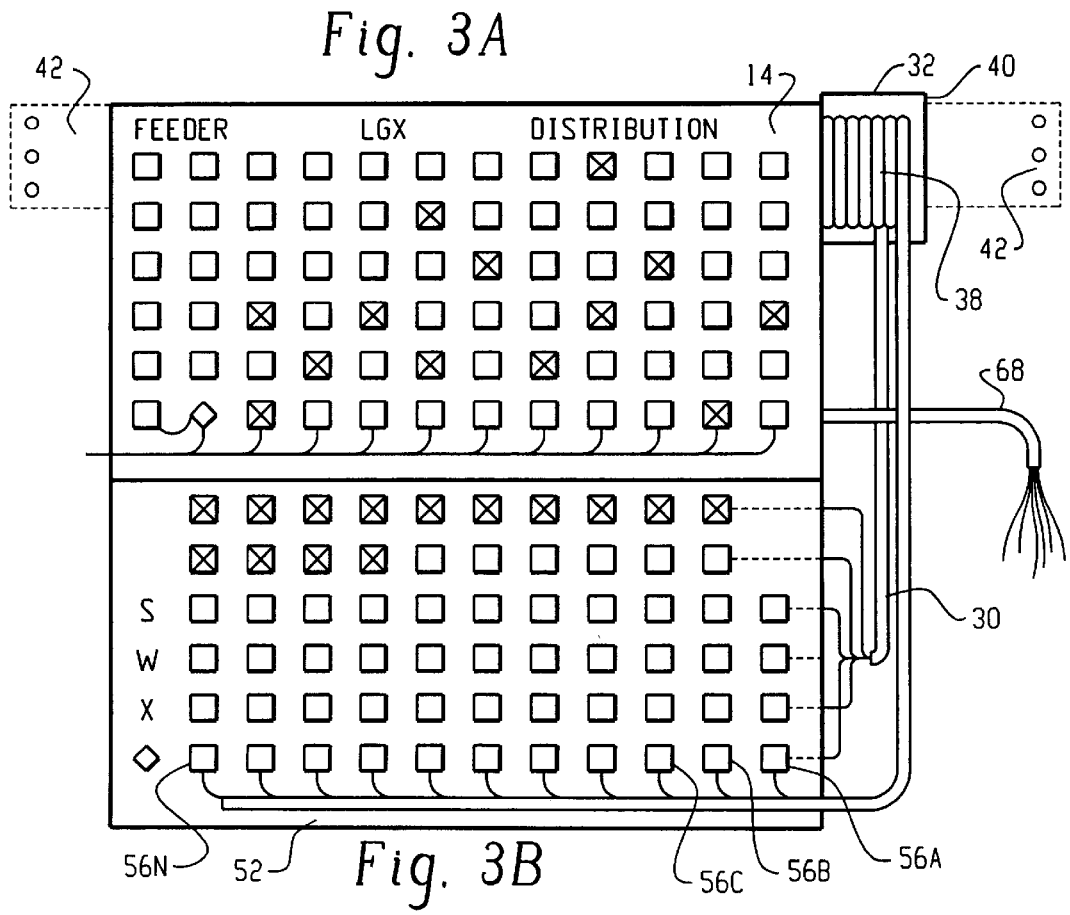

When one of the new panels such as new panel 24 is delivered to the remote terminal box 12 to upgrade or add further fiber-optical service and distribution to the terminal 12, the new panel 24 having the front face 52 such as shown in FIG. 2 and FIG. 3B is delivered and installed in the terminal 12. In the drawing shown in FIG. 3B, there is only the original panel 24 and the new panel 52. The new panel 24 with the front plate 52 as was discussed above includes the bundle of fiber optics 30 having one end of each fiber attached to the back of the distribution panel 24. The bundle 30, which is then coiled as shown at 38 and attached to support member 32 having the hook portion 40 (not shown), is hooked over the member 42 of the cabinet frame 44. Fiber-optical connectors 56A, 56B, 56C, and 56N can then be disconnected as shown in FIG. 2 from their matching connectors on panel face 52 of the new distribution panel 24 upon demand or as necessary and then reconnected to the selected and appropriate matching connectors on the original distribution panel 14.

Thus, there has been shown to this point new apparatus and methods for simple and easy modification and addition of new fiber-optical distribution panels which are readily used with existing panels.

As will be appreciated by those skilled in the art, the use of optical fibers rather than copper or other types of metal wiring for distribution of communication signals although having many advantages (primarily bandwidth) over copper distribution wiring also presents new difficulties that must be taken into consideration. More specifically, whereas sharp bends with copper wiring and the like is often avoided to avoid breaking of the wire or breaking of the insulation, such sharp bends typically do not result in deterioration of the transmission properties of the wire unless a break actually occurs. However, with optical fibers it is well known that if the radius of bend is too great, the light traveling through the fiber will either escape or not be reflected down the length of the fiber such that a great deal of attenuation can occur. Therefore, it is important that all of the fiber optics avoid short or small radius bends.

To this end, referring now to FIGS. 4, 5, and 6, there are shown a support spool and rails for supporting one or more of the spools. As shown, the spools which are typically but not necessarily molded plastic have a backing or attaching plate 70 molded with the body of the spool 72. A plurality of ears, such as ears 73A, 73B, 74A, 74B, 76A, and 76B, separate and help route the individual optical fibers. Also, defined between the body 72 of the spool and the backing or attaching plate 70 is a groove 80 which can be clearly seen in FIG. 5.

As shown in FIG. 6, there is a support bracket 82 having mounting flanges 84 and 86 which are mounted to support members of the cabinet frame 12. A typical installation of the support bracket 82 with four spools 72A, 72B, 72C, and 72D is shown in FIG. 1.

Referring again to FIG. 6, it is seen that there is defined in the support rail 82 several support notches such as notches 88, 90, 92, and 94. As shown, the support rail 82 has a front face 96 and a side face 98 such that the rail has somewhat of an "L" cross-sectional shape. As shown, each of the notches such as notch 88 includes a throat portion 100 on face 96 which merges with an entrance groove 102 defined in the side portion of leg 98.

Referring again to FIG. 4, it is seen that in a preferred embodiment the back or attaching plate 70 of spool 72 may be rectangular shaped with one short side indicated by the dimensional double arrow 104 and a long side indicated by dimension double-headed arrow 106. In the preferred embodiment as shown, the groove 102 defined in side face 98 of the support rail 82 is such a size that it is large enough to receive the short side indicated by the dimensional arrow 104 of the backing plate but is too small to receive the long side indicated by dimensional arrow 106. Thus, to mount the spool 70 in the support rail notch 88, it is necessary to rotate the spool to line up the short side indicated by dimensional arrow 104 with the entrance groove 102 and slide the spool into the notch 88. Once the spool 70 is in the notch 88, it can then be rotated 90 degrees as indicated by arcuate arrow 103 such that the ears extend in an upward and downward direction as shown in the FIG. 1. Thus, it will also be appreciated that it is now impossible for the spool to be dislodged from the support rail 82 unless it is first rotated 90 degrees to present the short side 104 to the entrance groove.

It will also be noted that when two spools are mounted in adjacent notches such as notches 88 and 90 and rotated in place, the ears of one of the spools substantially touch the ears of the adjacent spool thereby preventing the individual fibers from becoming dislodged from their selected position. Thus, if an individual fiber is to be disconnected or reconnected to a different location where a new support spool will be required, it may be necessary to rotate one of the spools sufficiently to allow the passage of the cable between the adjacent ears.

The corresponding structures, materials, acts, and equivalents of all means or step plus function elements in the claims below are intended to include any structure, material, or act for performing the function in combination with other claimed elements as specifically claimed.

We claim:

1. An optical fiber distribution unit mounted in a distribution cabinet with a support frame comprising:
   a support member;
   a multiplicity of optical fibers, each optical fiber having a first end and a terminal end, said multiplicity bundled together and said bundle coiled and attached to said support member;
   a bracket secured to said support member for mounting said distribution unit, said bracket defining a hook portion for hooking to a portion of said support frame;
   a quick disconnect member cooperating with said bracket for securing said mounted distribution unit to said support frame, said quick disconnect member defining a spring-catch spaced from said hook portion and located to engage another portion of said frame.

2. An optical fiber distribution unit for use with a distribution terminal having a support frame comprising:
   a support member;
   a multiplicity of optical fibers, each optical fiber having a first end and a terminal end, said multiplicity bundled together and said bundled together and said bundle coiled and attached to said support member;
   a bracket secured to said support member for mounting said distribution unit;
   a support rail defining a plurality of support notches, said support rail being secured to said frame;
   at least one spool being received and supported by one of said notches such that said spool is positioned and located so as to support at least one of said optical fibers in said bundle as said optical fiber is routed to a termination point, said spool including a fiber-optical support post and said support post defines a circumferential attaching groove at a first end of said spool, and said support rail has a front face and a side face to form an "L" cross-sectional shape, said support notches defined in said front face of said support rail having a throat portion extending from an entrance groove defined in said side face of said rail such that said circumferential groove of said spool passes through said throat portion to said support notch.

3. The apparatus of claim 2 wherein said spool further defines a backing plate attached to said first end of said spool, said backing plate having a larger area than the cross section of said spool and said entrance groove being large enough to receive said backing plate.

4. The apparatus of claim 2 and further comprising a quick disconnect member cooperating with said bracket for securing said mounting distribution unit.

5. An optical fiber distribution unit for use with a distribution terminal having a support frame comprising:
   a support member;
   a multiplicity of optical fibers, each optical fiber having a first end and a terminal end, said multiplicity bundled together and said bundle coiled and attached to said support member;
   a support rail defining a plurality of support notches, said support rail being secured to said frame;
   at least one spool being received and supported by one of said notches such that said spool is positioned and located so as to support at least one of said optical fibers in said bundle as said optical fiber is routed to a termination point;
   a bracket secured to said support member for mounting said distribution unit;
   a quick disconnect member cooperating with said bracket for securing said mounted distribution unit;
   said bracket defining a hook portion for hooking over a portion of said frame to mount said unit to said frame and said quick-disconnect member is a spring-catch spaced from said hook portion and located to engage another portion of said frame.

6. In a terminal facility having a first panel mounted to a support frame for providing distribution terminals for optical fibers, apparatus for adding a second optical fiber distribution panel, comprising:
   a second panel for providing distribution connections for optical fibers; and
   an optical fiber distribution unit comprising:
   a support member;
   a multiplicity of optical fibers, each optical fiber having a first end terminating in said second panel and a terminal end having a connector suitable for connecting to a matching connector on said first panel, said multiplicity of optical fibers bundled together and said bundle coiled and attached to said support member,
   an attaching bracket secured to said support member for mounting said distribution unit to said support frame at a location proximate said first panel, said bracket defining a hook portion for hooking over a portion of said frame to mount said unit to said frame and said quick disconnect member is a spring-catch spaced from said back portion and located to engage another portion of said frame.

7. The apparatus of claim 6 and further comprising:
   a support rail defining a plurality of support notches, said support rail being secured to said frame; and
   at least one spool received and supported by one of said notches such that said spool is positioned and located so as to support at least one of said optical fibers in said bundle as said optical fiber is routed to a termination point.

8. In a terminal facility having a first panel mounted to a support frame for providing distribution terminals for optical fibers, apparatus for adding a second optical fiber distribution panel, comprising:
   a second panel for providing distribution connections for optical fibers; and
   an optical fiber distribution unit comprising:
   a support member;
   a multiplicity of optical fibers, each optical fiber having a first end terminating in said second panel and a terminal end having a connector suitable for connecting to a matching connector on said first panel, said multiplicity of optical fibers bundled together and said bundle coiled and attached to said support member,
   an attaching bracket secured to said support member for mounting said distribution unit to said support frame at a location proximate said first panel;
   a support rail defining a plurality of support notches, said support rail being secured to said frame;
   at least one spool received and supported by one of said notches such that said spool is positioned and located so as to support at least one of said optical fibers in said bundle as said optical fiber is routed to a termination point said spool includes a fiber-optic support post and said support post defines a circumferential attaching groove at a first end of said support post, and said support rail has a front face and a side face so as to form an "L" cross-sectional shape, said support notches defined in said front face of said rail and having a throat portion extending from an entrance groove defined in said side face of said rail such that said circumferential groove of said spool passes through said throat portion to said support notch.

9. The apparatus of claim 8 wherein said spool further defines a backing plate attached to said first end of said spool, said backing plate having a larger area than the cross section of said spool, and said entrance groove defined in said support rail being large enough to receive said backing plate.

10. The apparatus of claim 2 wherein said optical fiber distribution unit is mounted in a distribution cabinet with a support frame and further comprising a quick disconnect member cooperating with said bracket for securing said mounted distribution unit to said support frame.

11. The apparatus of claim 2 wherein said distribution unit is for use with a distribution terminal having a support frame and said bracket defines a hook portion for hooking to a portion of said support frame for mounting said unit to said frame.

12. The apparatus of claim 11 wherein said optical fiber distribution unit is mounted in a distribution cabinet with a support frame and further comprising a quick disconnect member cooperating with said bracket for securing said mounted distribution unit to said support frame.

13. The apparatus of claim 14 wherein said quick disconnect member defines a spring-catch spaced from said hook portion and located to engage another portion of said frame.

14. The apparatus of claim 1 and further comprising:
a support rail defining a plurality of support notches, said support rail being secured to said frame; and
at least one spool being received and supported by one of said notches such that said spool is positioned and located so as to support at least one of said optical fibers in said bundle as said optical fiber is routed to a termination point.

* * * * *

UNITED STATES PATENT AND TRADEMARK OFFICE
CERTIFICATE OF CORRECTION

PATENT NO. : 6,278,829 B1
DATED : August 21, 2001
INVENTOR(S) : BuAbbud et al.

Page 1 of 1

It is certified that error appears in the above-identified patent and that said Letters Patent is hereby corrected as shown below:

<u>Column 5, claim 2,</u>
Line 30, delete "said bundled together and"

Signed and Sealed this

Sixteenth Day of April, 2002

Attest:

Attesting Officer

JAMES E. ROGAN
*Director of the United States Patent and Trademark Office*